United States Patent
Boyer et al.

(10) Patent No.: US 7,442,741 B2
(45) Date of Patent: Oct. 28, 2008

(54) STABLE AQUEOUS DISPERSIONS OF HYDROPHILIC PHENOLIC RESINS HAVING LOW XYLENOL AND BISPHENOL-A CONTENT

(75) Inventors: Peter C. Boyer, Conyers, GA (US); Jeffrey L. Mills, Newnan, GA (US)

(73) Assignee: Georgia-Pacific Chemicals LLC, Atlanta, GA (US)

(*) Notice: Subject to any disclaimer, the term of this patent is extended or adjusted under 35 U.S.C. 154(b) by 264 days.

(21) Appl. No.: 11/102,865

(22) Filed: Apr. 11, 2005

(65) Prior Publication Data

US 2006/0229415 A1    Oct. 12, 2006

(51) Int. Cl.
*C09D 161/10* (2006.01)
*C09D 161/14* (2006.01)

(52) U.S. Cl. .................. 524/510; 524/541; 525/58; 525/501

(58) Field of Classification Search .............. None
See application file for complete search history.

(56) References Cited

U.S. PATENT DOCUMENTS

| | | | |
|---|---|---|---|
| 3,767,612 A * | 10/1973 | Grazen ............... 523/158 |
| 4,124,554 A | 11/1978 | Fry | |
| 4,157,324 A | 6/1979 | Culbertson | |
| 4,400,229 A | 8/1983 | Demmer et al. | |
| 4,788,236 A | 11/1988 | Kopf | |
| 5,200,455 A | 4/1993 | Warren | |
| 5,548,015 A | 8/1996 | Bourlier et al. | |
| 5,552,186 A | 9/1996 | Bourlier et al. | |
| 5,864,003 A | 1/1999 | Qureshi et al. | |
| 5,939,159 A | 8/1999 | Shiono et al. | |
| 5,977,253 A | 11/1999 | Warakomski | |
| RE37,023 E | 1/2001 | Bourlier et al. | |

FOREIGN PATENT DOCUMENTS

| | | |
|---|---|---|
| GB | 1505412 | 3/1978 |
| WO | WO 96/23028 | 8/1996 |

OTHER PUBLICATIONS

International Search Report for PCT/US2006/012243 mailed Oct. 27, 2006.

\* cited by examiner

*Primary Examiner*—David Buttner
(74) *Attorney, Agent, or Firm*—Michael S. Kerns

(57) ABSTRACT

Storage stable aqueous dispersions of a heat-reactive hydrophilic phenolic resin (e.g., phenol/formaldehyde) are disclosed. The dispersions comprise a base resin that is the reaction product of an aromatic alcohol and an aldehyde, and an etherified resin component selected from the group consisting of an etherified phenol/aldehyde resin, an etherified cresol/aldehyde resin, and mixtures thereof. The dispersions further comprise a protective colloid (e.g., polyvinyl alcohol). The addition of the etherified resin component in an amount of at least about 20% by weight of the base resin provides storage stability, but does not adversely affect the desirable physical and chemical characteristics (e.g., chemical resistance) of end products made from such dispersions. Moreover, the dispersions of the present invention can avoid the use of etherified resin components derived from bisphenol-A and/or xylenols, which present heath concerns in food coating applications.

19 Claims, No Drawings

STABLE AQUEOUS DISPERSIONS OF HYDROPHILIC PHENOLIC RESINS HAVING LOW XYLENOL AND BISPHENOL-A CONTENT

FIELD OF THE INVENTION

The present invention relates to aqueous dispersions of hydrophilic phenolic resin polymers using a protective colloid. The incorporation of an etherified phenol/formaldehyde, an etherified cresol/formaldehyde, and/or an etherified phenol/cresol/aldehyde resin component allows for the formation of a stable aqueous dispersion that has a low volatile organics content and that is essentially free of bisphenol-A and xylenols.

BACKGROUND

Phenolic resin dispersions are commercially important materials that are used in an array of diverse products. Examples include coatings, such as anti-corrosive baking enamels for metals and coatings used as food contact surfaces; adhesives; contact adhesives or tack-building agents in many acrylic, vinyl acrylic, vinyl and rubber latexes; binders for organic and inorganic materials; laminates; moldings; and other uses.

Dispersions, however, are susceptible to losing their homogeneity over time due to phase separation by settling, coalescence, agglomeration, etc. of the dispersed phase. Therefore, storage stability, or the long-term ability of a dispersion to maintain homogeneous, well-mixed dispersed and continuous phases, is a major consideration affecting the practical utility and thus ultimately the salability of a dispersion. As is well known in the art generally (and particularly with respect to phenolic resin dispersions), the addition of any component to a dispersion will have an unpredictable effect on dispersion stability. This is due to the potential impact of the component on many factors, acting both independently and interactively, that affect dispersion stability, including zeta potential (i.e., inter-particle electrostatic attraction or repulsion), particle size, pH, and solution conductivity. Moreover, the use of any stabilizing agent can adversely affect the ultimate properties of the materials made from the dispersion. Therefore, the art has been continually challenged with the development of storage stable phenolic resin dispersions having desirable physical and chemical characteristics.

For example, aqueous phenolic resin dispersions made with gums or cellulosic materials as the dispersing agent were found to exhibit poor storage stability. Moreover, the coatings resulting from such dispersions had unacceptable chemical resistance due to the hydrophilic nature of the dispersing agent. Surfactants, such as phosphate esters, have also been tried with limited success, as surfactant-containing dispersions provide unacceptably poor film properties caused by surface migration of the surfactant.

Stable dispersions of phenolic resin polymers have been achieved using a protective colloid material, such as polyvinyl alcohol (PVA), as a dispersant in U.S. Pat. No. 4,400,229. Likewise, novolac resin dispersions are stabilized with PVA in U.S. Pat. No. 4,788,236. Protective colloids can also be used in systems relying on an organic coupling solvent, as described in U.S. Pat. No. 4,124,554, wherein an aqueous dispersion is made from a pre-formed, solid, substantially water-insoluble, phenolic resin (either a novolac or a resole). Similarly, U.S. Pat. No. 5,200,455 teaches the mixing of (a) a pre-formed, solid, and substantially water-insoluble phenolic resin, (b) water, (c) an organic coupling solvent, and (d) PVA, at a temperature and for a period of time sufficient to form a dispersion of the phenolic resin in water. U.S. Pat. No. 5,939,159 teaches an aqueous dispersion prepared from an acrylic resin, an aromatic epoxy resin and a bisphenol-F product comprising a reaction product of bisphenol F and formaldehyde, with the bisphenol-F product being etherified.

U.S. Pat. Nos. 5,548,015 and 5,552,186 address the problem of making stable dispersions of hydrophilic phenolic resin polymers using PVA as a protective colloid. These patents teach that, while PVA works well with hydrophobic phenolic polymers (e.g., bisphenol-A), it does not form stable dispersions with highly functional, hydrophilic resins (e.g., phenol/formaldehyde resins) that are desirable in coating applications due to their chemical resistance properties. The solution offered in these patents is to incorporate a small proportion of highly hydrophobic etherified bisphenol-A resin into an aqueous solution of the hydrophilic phenolic resin and protective colloid to form a stable dispersion with low volatile organics content. The substitution of less hydrophobic additives (e.g., etherified phenol/formaldehyde) in place of the etherified bisphenol-A is taught not to provide stable dispersions.

Unfortunately, dispersions of hydrophilic polymers made according to the above-noted U.S. Pat. Nos. 5,548,015 and 5,552,186 can contain residual amounts of bisphenol-A, which is currently under increasing scrutiny as a potential health risk, especially when it is present in resin formulations that are ultimately used to coat surfaces, such as cans, that contact food. Therefore, there remains a need in the art for aqueous dispersions of hydrophilic phenolic resins that are essentially free of bisphenol-A, as well as other undesirable impurities, such as xylenols, that are often present to some extent in certain of the aromatic alcohols used as starting materials in the preparation of hydrophobic additives that are used to stabilize dispersions of hydrophilic phenolic resins.

SUMMARY OF THE INVENTION

It has now been discovered that storage stable aqueous dispersions of hydrophilic resins (e.g., phenol/formaldehyde resoles) can be made without the use of an etherified hydrophobic stabilizing resin that is derived from bisphenol-A. In particular, the incorporation of an etherified phenol/aldehyde, an etherified cresol/aldehyde, an etherified phenol/cresol/aldehyde, or a mixture thereof in a hydrophilic phenolic resin dispersion comprising a protective colloid (e.g., PVA), under proper conditions, can provide a storage stable dispersion that is substantially or completely free of bisphenol-A and xylenols. Coatings made from such dispersions are not only chemically resistant, but are also well-suited for food container applications.

Accordingly, in one embodiment the present invention is a storage stable aqueous dispersion of a phenolic resin. The dispersion comprises (i) a heat-reactive hydrophilic phenolic base resin (e.g., a phenol/formaldehyde resin resole) that is the reaction product of an aromatic alcohol and an aldehyde; (ii) an etherified resin component selected from the group consisting of an etherified phenol/aldehyde resin, an etherified cresol/aldehyde resin, an etherified phenol/cresol/aldehyde resin, and mixtures thereof, wherein the etherified resin component is present in an amount of at least about 20% by weight of the base resin; and (iii) a protective colloid. In a preferred embodiment, the dispersion is storage stable for at least about 3 months. In another preferred embodiment, the etherified resin component comprises an etherified phenol/cresol/formaldehyde resin.

In another embodiment, the present invention is a method for making a storage stable aqueous dispersion of a phenolic resin. The method comprises blending, at a blending temperature of less than about 60° C., (a) a heat-reactive hydrophilic phenolic base resin that is the reaction product of an aromatic alcohol and an aldehyde, (b) an etherified resin component selected from the group consisting of an etherified phenol/aldehyde resin, an etherified cresol/aldehyde resin, an etherified phenol/cresol/aldehyde resin, and mixtures thereof, wherein the etherified resin component is present in an amount of at least about 20% by weight of the base resin, and (c) a protective colloid. In a preferred embodiment, the blending temperature is from about 25° C. to about 60° C.

These and other embodiments, as well as various preferred embodiments, are apparent from the following Detailed Description.

DETAILED DESCRIPTION OF THE INVENTION

Aqueous dispersions of the present invention comprise a heat-reactive hydrophilic phenolic resin (e.g., a phenol/formaldehyde resole), which is also referred to herein as the "base" resin. The inventors have discovered that the addition of an etherified phenol/aldehyde resin, an etherified cresol/aldehyde resin, an etherified phenol/cresol/aldehyde resin or a mixture thereof, at an effectively low blending temperature, to the base resin can result in storage stabile dispersions, despite contrary teachings in the art regarding the use of etherified resin stabilizers that are less hydrophobic than etherified bisphenol-A. The etherified phenol/aldehyde resin, etherified cresol/aldehyde resin, etherified phenol/cresol/formaldehyde resin, or mixture thereof is also referred to herein as the "etherified resin component".

Importantly, dispersions of the present invention can avoid the use of bisphenol-A and are substantially free of xylenols, both of which are the subject of increasing concern in food container coating applications. Furthermore, the end products made from aqueous phenolic resin dispersions with the etherified phenol- and/or cresol-based resin additives maintain the desirable chemical resistance and physical properties of the base resin alone.

The heat-reactive base resin is the reaction product of an aromatic alcohol and an aldehyde. By "heat-reactive" is meant that the resin will continue to polymerize when heat is applied. Suitable aromatic alcohols for use in preparing the base resin include phenol and various alkylated phenols such as o-, m-, and p-cresol; p-tert-3,4,5-trimethylphenol; 3-ethyl phenol; 3,5-diethyl phenol; p-butyl phenol; 3,5-dibutyl phenol; and p-amylphenol. Other aromatic alcohols include p-cyclohexyl phenol; p-octyl phenol; 3,5-dicyclohexyl phenol; p-phenyl phenol; p-crotyl phenol; 3,5-dimethoxy phenol; 3,4,5-trimethoxy phenol; p-ethoxy phenol; p-butoxy phenol; 3-methyl-4-methoxy phenol; and p-phenoxy phenol. Other alkylated phenols and bisphenols not specifically listed herein also are suitable, but generally should be avoided for reasons noted above. Mixtures of aromatic alcohols may also be used.

Phenol is a preferred aromatic alcohol, as the use of phenol yields a phenolic resin that is very hydrophilic and forms a coating having a high crosslink density and excellent chemical resistance. Also, phenol is readily available at a reasonable cost.

Representative of suitable aldehydes for use in preparing the heat-reactive hydrophilic phenolic resin are formaldehyde, acetaldehyde, propionaldehyde, n-butylaldehyde, n-valeraldehyde, caproaldehyde, heptaldehyde, straight-chain aldehydes having a carbon number up to about 8, and mixtures thereof. Formaldehyde is preferred aldehyde because of its ready availability at reasonable cost. Materials that form formaldehyde in situ can also be employed.

The above-listed phenols and aldehydes are acceptable for use in resin coatings that contact food for human consumption. While these compounds have the additional advantage of forming phenolic base resins considered suitable for use in food containers, any heat-reactive hydrophilic phenolic resin is suitable for use in this invention.

Any method known in the art for obtaining a suitable heat-reactive hydrophilic phenolic resin from the reaction of the aromatic alcohol and aldehyde may be employed. Typically, the aromatic alcohol and the aldehyde simply are reacted together at an elevated (e.g., above 25° C.) temperature under conditions and for a time sufficient to produce the desired resin. Preferably, the reaction product between the aromatic alcohol and aldehyde is obtained after these components are maintained at a temperature from about 50° C. to about 150° C., and more preferably from about 65° C. to about 110° C. and for a time sufficient to cause alkylolation (e.g., methylolation) of at least some of the reactive sites of the aromatic alcohol. Optionally, an alkaline catalyst or other catalytic agent (e.g., hexamethylene tetramine) may be employed to facilitate this reaction.

Alkylolation refers to the addition of a hydroxyalkyl functionality at reactive sites (generally the ortho- and para-positions of the aromatic rings) of the aromatic alcohols. In this manner, the reaction product obtained is typically in the form of an A-stage phenolic resin or resole that is heat-reactive (i.e., can be thermoset or cured by heating in a subsequent crosslinking step). To verify that the alkylolation has proceeded to a desired degree, the extent of reaction between the aromatic alcohol and the aldehyde may be monitored directly, for example, by sampling the reaction mixture for free aldehyde content. Otherwise, a number of indicia (e.g., viscosity or refractive index) are known in the art as a means of monitoring the progress of the reaction indirectly.

Suitable alkaline catalysts for use in forming the base resin include the oxides and hydroxides of alkali metals (e.g., sodium, potassium, and lithium oxides and hydroxides) and of alkaline earth metals (e.g., calcium, barium, and strontium oxides and hydroxides). Other strongly basic water-soluble substances that do not react with aldehydes, such as tertiary amines (e.g., triethylamine) and tertiary amino alcohols (2-dimethylamino-2-methyl-1-propanol and 2-dimethylamino-2-hydroxymethyl-1,3-propanediol) may also be employed. Mixtures of any of the above catalysts may also be effective. Preferred catalysts are sodium hydroxide, lime, sodium carbonate, dimethylaminoethanol, and potassium hydroxide. Of these, sodium hydroxide is most widely used. Typically, these catalysts are added as aqueous solutions. Preferably, the amount of catalyst used represents from about 0.1% to about 1% by weight of the combined amount of aromatic alcohol and aldehyde reacted to form the heat-reactive hydrophilic phenolic resin. After reaction under alkaline conditions, it may be desired to neutralize or acidify the resin using phosphoric acid or any other conventional acid, such as those described in U.S. Pat. No. 5,864,003, used for this purpose. Acid addition, which may be accompanied by heating (e.g., to a temperature from about 50° C. to about 110° C. for a time from about 30 minutes to about 5 hours) is potentially useful for a number of purposes, including stabilization, reduction of viscosity, improvement of dispersion forming characteristics, termination of the base-catalyzed alkylolation reaction to halt resin advancement, etc.

The relationship between crosslink density and the molar ratio of aromatic alcohol to aldehyde used in forming the base resin is described in detail in U.S. Pat. No. 5,548,015. Because increased crosslink density improves chemical resistance, it is preferred to utilize base resins having high crosslink density. Preferably, therefore, the molar ratio of aldehyde (e.g., formaldehyde) to aromatic rings in the aromatic alcohol (known as the "F/P ratio" in phenol/formaldehyde resins) is from about 1:1 to about 2:1, and more preferably is from about 1.1:1 to about 1.75:1. The F/P ratio is calculated on a "per aromatic alcohol ring" basis.

The inventors have discovered that blending the base resin described above with an etherified phenol/aldehyde resin, an etherified cresol/aldehyde resin, an etherified phenol/cresol/aldehyde resin, or a mixture thereof (i.e., an etherified resin component) can be used to form a stable dispersion without adversely affecting the chemical resistance of coatings made therefrom. Furthermore, such stable dispersions avoid the use of bisphenol-A and can also be prepared without any substantial introduction of xylenols (i.e., the various isomers of dimethyl phenol). The avoidance of bisphenol-A and xylenols is an especially important feature with respect to end uses involving the coating of food containers.

The etherified resin component can crosslink with the base resin and optionally other components in aqueous dispersions of the present invention to form a coating with high resistance to chemical degradation and/or corrosion. While a high degree of crosslinking is desirable in end products (particularly coatings) as a result of the final curing step, it is believed, without being bound by theory, that premature crosslinking between the etherified resin component and the base resin, upon co-dispersion, leads to instability of aqueous dispersions prepared therefrom. Importantly, it has now been determined that mixing or blending the etherified resin component and base resin at a sufficiently low temperature overcomes the dispersion instability problems noted in the art when aqueous phenolic resin dispersions employing etherified phenol/formaldehyde and etherified cresol/formaldehyde resins have been attempted.

Without being bound by theory, the stable dispersions of the present invention are in particular believed to result from the avoidance, during preparation and especially during mixing or blending, of temperatures that initiate cross linking reactions between the etherified resin component and the phenolic base resin. While etherified bisphenol-A has previously been used with success as an etherified resin component in aqueous phenolic resin dispersions, the art has not satisfactorily employed the more reactive and more hydrophilic etherified phenol/formaldehyde, etherified cresol/aldehyde, and/or etherified phenol/cresol/aldehyde resin components in such dispersions. As stated above, the increased reactivity of the etherified resin component of the present invention is overcome by reducing the temperature at which the etherified resin component and base resin are contacted. Furthermore, it is also believed that maintaining an appropriate the temperature of the phenolic base resin after its preparation will prevent it from advancing to point where its stability in a dispersion is adversely affected. Preferably, the blending temperature of the etherified resin component and the base resin is at most about 60° C., and more preferably from about 25° C. to about 60° C. The use of blending temperatures as indicated above is not meant to exclude temporary excursions to higher temperatures. Such temporary excursions lasting on the order of 10 minutes or less will not significantly promote dispersion instability, as the undesirable cross linking and resin advancement reactions discussed above are both "time at temperature" phenomena.

Also, despite the increased hydrophilicity of etherified phenol/formaldehyde, etherified cresol/formaldehyde, and/or etherified phenol/cresol/formaldehyde resins relative to the etherified bisphenol-A/formaldehyde resin used in the art, stable dispersions can nevertheless be prepared, preferably by incorporating a relatively larger amount of the former etherified resins. Preferably, the etherified resin component of the present invention is blended with an aqueous solution of the base phenolic resin, wherein the etherified resin component is added preferably in an amount of at least about 20% by weight, more preferably from about 30% to about 80% by weight, and even more preferably from about 60% to about 80% by weight, based on the weight of the base resin.

Quantities of less than about 20% by weight may not consistently provide stable dispersions. The upper limit of the etherified resin component addition level depends on the ultimately desired characteristics of the end product for which the aqueous dispersion is used. For example, quantities of greater than about 80% by weight may not provide a coating with chemical resistance characteristic of coatings made from the purely non-etherified base resin. However, such coatings, made from aqueous phenolic resin dispersions with a high content of the etherified resin component, may nevertheless be useful in many applications where high chemical resistance is not required. Without being bound by theory, increasing the quantity of etherified resin component relative to the more-reactive phenolic base resin generally increases the shelf life of the resin mixture. This is due to a general dilution effect, whereby the base resin becomes less concentrated, and therefore reaction of the base resin with itself is hindered. Bearing these factors in mind and with the guidance provided herein, skilled practitioners will be able to determine a suitable upper limit of the quantity of the etherified resin component.

Phenol/aldehyde, cresol/aldehyde, and/or phenol/cresol/aldehyde resins can be made into an ether form (i.e., etherified) using a variety of conventional processes. Typically, an adduct is first formed by the reaction of the phenol and/or cresol with an aldehyde to yield alkylolated phenols and/or cresols having a number of alkylol moieties. In a preferred embodiment wherein a mixture of phenol and cresols (e.g., a mixture of phenol, m-cresol, and p-cresol) is used to form an adduct, a mixture of phenol/aldehyde, cresol/aldehyde, and phenol/cresol/aldehyde adducts may be formed, generally comprising predominantly the latter adduct. This adduct may therefore be characterized as a "phenol/cresol/aldehyde adduct," even though some smaller amounts of phenol/aldehyde and cresol/aldehyde adducts are also formed. Without being bound by theory, it is believed that when a mixture of phenol and cresol is used to form an adduct with an aldehyde, the phenol and cresol monomers are randomly incorporated into the resin after some condensation of the alkyolated phenol and cresol components occurs, thereby forming predominantly a phenol/cresol/aldehyde resin.

Suitable aldehydes for reaction with phenol and/or cresol to form an alkylolated adduct prior to etherification are the same aldehydes as described above for preparing the base resin. Also, the same general conditions and procedures described above for reacting an aromatic alcohol with an aldehyde to form the base resin are also applicable to the formation of the alkylolated adduct ultimately used to form the etherified resin component. If a mixture of etherified phenol/aldehyde and cresol/aldehyde is used for the etherified resin component of the present invention, it is possible to first form an adduct of one aromatic alcohol (e.g., phenol) and an aldehyde, followed by the addition of a second aromatic alcohol (e.g., cresol) and more aldehyde.

The alkylol moieties are then reacted with an alcohol to form ether moieties of the etherified resin component of the present invention. These ether moieties will ultimately form cross links in the resulting end product (e.g., a coating) to promote the desired crosslink density and hence the desired chemical resistance. The etherified resin component, prepared in this manner, can thus be used to form a stable dispersion of the base resin, despite the fact that the etherified resin component is not as hydrophobic as the etherified bisphenol-A/formaldehyde resins used previously for this purpose. In fact, the art teaches against using such etherified resins, due to their insufficient hydrophobicity.

The functionality of the phenol/aldehyde, cresol/aldehyde, and phenol/cresol/aldehyde adducts described above for use in preparing the etherified resin component can be between one and three, i.e., these adducts can contain between one and three alkylol moieties per phenol or cresol. Preferably, the functionality of the adduct is from about 1.5 to about 2.75. In a preferred embodiment, therefore, the etherified resin component of the present invention is formed from a blend of an adduct of phenol/aldehyde and an adduct of cresol/aldehyde, wherein the blend of these adducts has a functionality from about 1.5 to about 2.75. As is understood in the art, the functionality of an adduct is an arithmetic average of the functionalities of the individual adduct moieties in the resin. Thus, for example, a blend of an equal number of moles of adducts having functionalities of 1 and 2 is considered to have a functionality equal to 1.5.

Adducts that are formed by the reaction of formaldehyde with phenol and cresol, include 2-methylol-phenol; 4-methylol-phenol; 2,4-dimethylol-phenol; 2,6-dimethylol-phenol; 2,4,6-trimethylol-phenol; 2-methylol-6-methyl-phenol; 4-methylol-2-methyl-phenol; 2,4-dimethylol-6-methyl-phenol; 2-methylol-5-methyl-phenol; 4-methylol-3-methyl-phenol; 2,4-dimethylol-5-methyl-phenol; and 2,4,6 trimethylol-5-methyl-phenol. In general, these alkylolated species will condense, or react with one another to some extent, in a random fashion, resulting in an adduct comprising predominantly phenol/cresol/formaldehyde.

The adducts described above contain reactive alkylol (e.g., methylol or hydroxymethyl) moieties that can react with an alcohol to form ethers, rendering these adducts more hydrophobic. Skilled practitioners recognize that ether formation according to the present invention can be effected with any alcohol. Alcohols particularly useful for the ether formation are preferably water immiscible, and particularly preferred are straight chain alcohols with at least four not more than about eight carbon atoms. An alcohol molecule that is too large can cause the resulting etherified resin to lose compatibility with other resins in the coating. Preferred alcohols for ether formation according to the present invention include the butanols, pentanols, hexanols, heptanols, and octanols. The more preferred alcohols include n-butanol, n-pentanol, n-hexanol, n-heptanol, and n-octanol. N-butanol is most preferred, as it is available in commercial quantities at an attractive price. N-butanol is also the lowest straight chain, non-water miscible alcohol. Moreover, adducts as described above that are etherified by n-butanol are as easily crosslinked as their corresponding non-etherified hydroxyl counterparts.

The use of water miscible alcohols (e.g., methanol, ethanol, and propanol) is not preferred for reasons of process economics. In particular, the use of a water miscible alcohol generally requires a large recycle stream. Further, lower alcohols tend to yield less effective etherified resins, in terms of their ability to stabilize phenolic resin dispersions of the present invention, than the water immiscible alcohols.

Preferred etherified resin components of the present invention include the reaction products of formaldehyde with phenol and/or cresol under alkaline conditions, with subsequent etherification with n-butanol. Etherified phenol/formaldehyde is particularly preferred, as are mixtures of phenol/formaldehyde, cresol/formaldehyde, and phenol/cresol/formaldehyde, that are etherified as described above with n-butanol. Also preferred are the etherified phenol/cresol/formaldehyde reaction products resulting from the etherification of the phenolic reaction product of formaldehyde with phenol and commercially available mixtures of m-cresol and p-cresol. Such reaction products may be optionally mixed with etherified phenol/formaldehyde, possibly synthesized in a separate etherification reaction or simply introduced as a commercially available etherified resin product. As noted above, preferred etherified resin components of the present invention have the advantage of not introducing bisphenol-A into the dispersions in which they are used; nor do they contain xylenols in any appreciable amount. The substantial absence of bisphenol-A and xylenols makes these dispersions especially suitable for coatings in the food industry. Preferably, therefore, dispersions of the present invention have a bisphenol-A content of less than about 0.1% by weight, more preferably less than about 100 parts per million (ppm) by weight, and even more preferably less than 10 ppm by weight. Likewise, dispersions of the present invention have a xylenol content (i.e., the total of all xylenol isomers) of preferably less than 0.1% by weight, more preferably less than about 100 ppm by weight, and even more preferably less than 10 ppm by weight.

In specific exemplary preparations of the etherified resin component used in the present invention, formaldehyde is reacted with phenol and/or cresol at a temperature from about 50° C. to about 100° C. and optionally diluted with a solvent. This mixture is heated at a temperature from about 70° C. to about 120° C. in the presence of n-butanol until the etherification reaction is complete. Phosphoric acid may be added before or during this reaction with n-butanol. Etherified resins prepared in this manner include commercially available GPRI-7571® (available from Georgia-Pacific Resins Incorporated, Atlanta, Ga.), which is an etherified phenol/formaldehyde resin. Other specific examples of etherified resins include those made by the alkylolation and subsequent etherification, as described above, of commercially available cresol blends, such as MP-99 (a mixture of approximately 55%-65% by weight m-cresol and 35%-45% by weight p-cresol, available from Merichem Company, Houston, Tex.). A further specific example of an etherified resin component is a mixture of etherified phenol/formaldehyde resin and etherified MP-99/formaldehyde, wherein n-butanol is used for the etherification of each of these resins.

Formation of a dispersion using the etherified resin component becomes more difficult if the etherified resin is dissolved in a non-water miscible solvent, such as n-butanol. If necessary, therefore, a water miscible solvent can be added as a stabilizer to increase the water miscibility of resin and non-water miscible solvent present therewith. Such a stabilizing solvent is miscible with the resin, with non-water miscible solvent, and with water. Preferred stabilizing solvents are the various alkyl ether derivatives of glycol. For example, diethylene glycol butyl ether, available under the trademark BUTYL-CARBITOL® (The Dow Chemical Company, Midland, Mich.) is suitable for this purpose. Other such stabilizing solvents meeting the solubility requirements described herein may be employed.

Formation of a dispersion from the base resin and etherified resin component preferably involves the addition of a protective colloid. It has been suggested in the art that these protective colloids function by reacting with the base resin upon curing. In U.S. Pat. No. 5,552,186, protective colloids are described in terms of their use in phenolic resin dispersions, as well as their postulated chemical interaction with such resins, both as a component of the resin dispersion and as an agent that forms cross links upon curing. Polyvinyl alcohol (PVA) is a preferred protective colloid, with a solution of partially hydrolyzed (at least 87%) polyvinyl alcohol being particularly preferred. A specific polyvinyl alcohol having the desired characteristics for use as a protective colloid is CEL-VOL 205® (Celanese Chemicals, Dallas, Tex.), having a molecular weight of about 31,000-50,000 and a degree of hydrolyzation of about 87-89%. If used, the protective colloid is present in an amount representing from about 5% to about 15%, and more preferably from about 6% to about 12%, of the combined weight of aromatic alcohol and aldehyde reacted to form the base hydrophilic resin.

The characteristics of coatings made from products comprising the dispersion of the invention are comparable to those of the base resin (e.g., phenol/formaldehyde resin) alone. As used with regard to this invention, "comparable" means that the coatings are essentially commercially interchangeable, in terms of their physical and chemical properties (e.g., chemical resistance) considered as a whole.

To form the aqueous phenolic resin dispersion of the invention, base resin and the etherified resin component are combined in an aqueous medium (e.g., water), along with the protective colloid and blended with energy sufficient to form the desired dispersion. The components need only be in a state suitable for forming the desired dispersion, and need not be combined in any particular order. For example, the base resin is usually available as a viscous fluid or a solid. It may be supplied in association with water and/or a viscosity-reducing agent (e.g., ethanol) or devoid thereof. Preferably, the base resin is in an aqueous medium. The etherified resin component may be supplied in solid or viscous fluid form. Often, at least one solvent is present with the etherified resin component. Preferably, the etherified resin component has a solids content of at least about 35% by weight, and more preferably from about 50% to about 75% by weight.

The aqueous medium used in preparing dispersions of the present invention is added in an amount that will yield a dispersion having a solids (i.e., nonvolatiles) content that is preferably from about 40% to about 80% by weight, and more preferably from about 40% to about 60% by weight. Other preferred properties of phenolic resin dispersions of the present invention include a viscosity from about 1,000 to about 10,000 centipoise (cp) at 25° C., more preferably from about 2000 to about 6000 cp at 25° C., a specific gravity from about 1.0 to about 1.2 g/ml at 25° C., and an opaque white color.

Dispersions of the present invention are stable. The etherified resin component, although not as hydrophobic as the etherified bisphenol-A/formaldehyde resin taught to be effective in the above-mentioned U.S. Pat. No. 5,552,186, is able to produce a dispersion of acceptable stability. Therefore, dispersions of the present invention are storage stable, meaning that they are able to maintain a homogeneous composition (i.e., without separation, settling, foaming, coalescence, agglomeration, etc. of the dispersed phase), over an extended period of storage time. Preferably, dispersions of the present invention are storage stable for at least about 3 months, more preferably for at least about 6 months, and even more preferably for at least about 1 year.

The property of storage stability may be affirmed by simple visual inspection, where, in the case of an opaque white aqueous dispersion of a phenolic resin, the gradual appearance of a clear, upper layer, may indicate a non-stable dispersion. Otherwise, stability may be assessed by diluting the dispersion. Stable dispersions are readily dilutable, whereas non-stable dispersions upon dilution tend to coalesce, often forming a non-dispersible, gelatinous mass that sinks to the bottom of the standing liquid. Preferably, dispersions of the present invention may be diluted with at least an equal amount of water (in a 50:50 dispersion:water ratio), without adversely affecting stability. In general, in non-stable dispersions, 10% or more of the particles comprising the dispersed phase have a diameter of greater than 10 microns, a property which leads to settling out and/or coalescing of the particles upon storage. Accordingly, in stable dispersions of the present invention, it is expected that less than 10% of the particles have a diameter of greater than 10 microns.

Other additives such as flexible resin materials (e.g., latex-based or aqueous phenoxy resins) and pH adjusting agents (e.g., triethanolamine) may also be incorporated, as described in the above-mentioned U.S. Pat. No. 5,552,186. This patent also describes a number of end uses for aqueous phenolic resin dispersions that are equally applicable to the dispersions of the present invention.

Importantly, dispersions of the present invention can be prepared without introducing bisphenol-A or xylenols, which are the subject of increasing health concerns in the food industry. Therefore, such dispersions are particularly suitable for coating formulations used for surfaces that contact food. Coating formulations containing dispersions of the present invention are first applied to a surface for contacting food and then baked for a time sufficiently long and at a temperature sufficiently high to form a cured, crosslinked coating. The time and temperature for the baking process are comparable to those for solvent-based phenolic resins, but may be increased slightly. In general, curing times and temperatures range from less than about 30 minutes at 190° C. to less than about 15 minutes at 215° C.

All references cited in this specification, including without limitation, all papers, publications, patents, patent applications, presentations, texts, reports, manuscripts, brochures, books, internet postings, journal articles, periodicals, and the like, are hereby incorporated by reference into this specification in their entireties. The discussion of the references herein is intended merely to summarize the assertions made by their authors and no admission is made that any reference constitutes prior art. Applicants reserve the right to challenge the accuracy and pertinence of the cited references. In view of the above, it will be seen that several advantages of the invention are achieved and other advantageous results obtained.

As various changes could be made in the above methods and compositions without departing from the scope of the invention, it is intended that all matter contained in this application, including all theoretical mechanisms and/or modes of interaction described above, shall be interpreted as illustrative only and not limiting in any way the scope of the appended claims.

The following examples are set forth as representative of the present invention. These examples are not to be construed as limiting the scope of the invention as these and other equivalent embodiments will be apparent in view of the present disclosure and appended claims.

EXAMPLE 1

Preparation of a an Etherified Phenol/Cresol/Formaldehyde Resin, as an Etherified Resin Component Etherified resin, to be used as a component of an aqueous dispersion of the present invention, was prepared as a mixture of etherified phenol/formaldehyde, etherified cresol/formaldehyde, and etherified phenol/cresol/formaldehyde. The materials used for this preparation and their weight contributions are as described below in Table 1. Without being bound by theory, it is believed that the phenol and cresol monomers in the reaction mixture are thought to be randomly incorporated into the etherified resin. An etherified ter-polymer of phenol, cresol, and formaldehyde is thought to make up a predominant portion of the etherified resin.

TABLE 1

| Component | Weight, g |
|---|---|
| phenol | 363.4 |
| formaldehyde, 50 wt-% solution, first charge | 289.1 |
| sodium hydroxide, 50% aqueous solution | 7.8 |
| water, first charge | 214.6 |
| formaldehyde, 50 wt-% solution, second charge | 321.6 |
| MP-99 (60 wt-% m-cresol, 40 wt-% p-cresol) | 417.9 |
| formaldehyde, 50 wt-% solution, third charge | 408.0 |
| water, second charge | 143.3 |
| n-butanol, first charge | 272.7 |
| n-butanol, second charge | 19.4 |
| phosphoric acid, 75% aqueous solution | 19.4 |
| BUTYL-CARBITOL ® | 272.8 |

Referring to the materials listed in Table 1, an etherified resin component of the present invention was prepared by initially combining the phenol and the first charge of 50% formaldehyde solution and heating the mixture to 45° C. The initial refractive index of the mixture was measured and found to be 1.480. The 50% aqueous NaOH solution and the first charge of water were added to obtain an alkaline environment, and the mixture was then heated to 75° C. under vacuum reflux. Upon attaining the 75° C. reaction temperature, the second charge of 50% formaldehyde solution was added gradually over a 30 minute period, and the mixture was held at the reaction temperature for an additional 45 minutes.

Based on the amounts of formaldehyde in the combined first and second charges and the amount of phenol, a 2.6:1 molar ratio of formaldehyde:phenol was used initially to prepare a phenol/formaldehyde adduct having methylol functional groups. While maintaining 75° C., the MP-99 (60 wt-% m-cresol, 40 wt-% p-cresol) was added. Shortly thereafter, the third charge of 50% formaldehyde solution was added over a period of about 45 minutes, followed by the addition of the second charge of water. The reaction mixture was maintained at 75° C. for an additional 75 minutes. Afterwards, the reaction mixture was cooled to about 50° C. and a vacuum distillation was carried out until a 65° C. endpoint was achieved. A total of about 879 grams of material were removed as distillate overhead.

To etherify the resulting phenol/cresol/formaldehyde adduct, the first charge of n-butanol was added, and the mixture was allowed to cool to room temperature. After standing overnight, the mixture was heated to 45° C., and the second charge of n-butanol and the 75% phosphoric acid solution were added. The resulting mixture had a pH of 3.09, a water content of 2.36% by weight, and a viscosity of 291 cp. This mixture was then heated to 95° C. under vacuum reflux. At 95° C., the mixture was azeotropically distilled for about 3 hours, after which time the BUTYL-CARBITOL® (The Dow Chemical Company, Midland, Mich.) solvent was added and the resulting solution was filtered The final etherified phenol/cresol/formaldehyde resin component had a solids content of 70.7% by weight, a water content of 0.73% by weight, a free phenol content of 1.1% by weight, and a free m-/p-cresol (combined) content of 3.3% by weight, a viscosity of 13,800 cp, and a refractive index of 1.537. The etherified resin component could be adjusted to 65% and 60% solids content, with a corresponding reduction in viscosity to 4980 cp (and refractive index to 1.527) and 3240 cp (and refractive index to 1.523), respectively, by the addition of n-butanol.

Based on the above, the etherified resin component was prepared with an overall molar ratio of formaldehyde:phenolic components (phenol and cresol combined) of 2.2:1 and also with the addition of NaOH and BUTYL-CARBITOL® (The Dow Chemical Company, Midland, Mich.) in amounts representing 0.22% and 15%, respectively, of the combined weight of formaldehyde solution and phenolic components (phenol and cresol) that were reacted to form the etherified resin component.

EXAMPLE 2

Preparation of an Aqueous Phenol/Formaldehyde Resin Dispersion Using the Etherified Resin The etherified phenol/cresol/formaldehyde resin component, prepared in Example 1, was used to prepare an aqueous dispersion of a phenol/formaldehyde resin. The materials used in preparing this dispersion and their weight contributions are as described below in Table 2.

TABLE 2

| Component | Weight, g |
|---|---|
| phenol | 482.1 |
| formaldehyde, 50 wt-%, first charge | 335.9 |
| water, first charge | 83.5 |
| hexamethylene tetramine | 8.3 |
| water, second charge | 16.2 |
| ethanol | 61.2 |
| etherified phenol/cresol/formaldehyde resin component, as prepared in Example 1 (70 wt-% solids) | 534.7 |
| ammonium hydroxide, 28 wt-% aqueous solution | 0.7 |
| water, third charge | 0.7 |
| CELVOL 205 ® | 70.3 |
| water, fourth charge | 656.4 |

Referring to the materials listed in Table 2, the heat-reactive hydrophilic resin (i.e., the base resin) was prepared by initially combining the phenol and the first charge of 50% formaldehyde and heating the mixture to about 48° C. The initial refractive index of the mixture was measured and found to be 1.486. The first charge of water was added, reducing the refractive index of the mixture to 1.470. The catalytic agent hexamethylene tetramine, together with the second charge of water, were added, and the mixture was then heated to 100° C. and held at this temperature for 65 minutes under reflux conditions. Thereafter, the mixture was cooled to 55° C. and vacuum distilled to a water content of approximately 16%. A total of about 214 grams of material were removed as distillate overhead.

The ethanol was then added to reduce the viscosity of the phenol/formaldehyde reaction mixture, which was thereafter cooled. The mixture was again heated to 80° C. to further react and form the base resin. During this reaction time of about 3-4 hours, the viscosity and refractive index of the reaction mixture was periodically monitored to ascertain the completeness of the alkylolation reaction. Based on Table 2, a 1.09:1 molar ratio of formaldehyde:phenol was used in preparing the base resin. An aqueous dispersion of this base resin was thereafter prepared as described below.

The base resin was cooled to about 50° C. prior to adding the etherified phenol/cresol/formaldehyde resin component, as prepared in Example 1 (70 wt-% solids). The resulting mixture of the base resin and the etherified resin component was further cooled to about 30° C., at which point the ammonium hydroxide and third charge of water were added. The amount of etherified resin added represented about 69% by weight of the phenolic base resin.

The mixture of the base resin and the etherified resin component was then heated to about 80° C., at which point the CELVOL 205® (Celanese Chemicals, Dallas, Tex.) polyvinyl alcohol protective colloid was gradually added and mixed for 10 minutes. The amount of the polyvinyl alcohol added represented about 10.8% by weight (based on the combined weight of phenol and formaldehyde used to prepare the base resin). The fourth charge of water was then gradually added while maintaining the mixture at 80° C., until it was gradually cooled to 50° C. toward the end of the water addition. After all of the fourth charge of water was added, the mixture was cooled further to room temperature and thoroughly mixed during this cooling period.

The resulting aqueous dispersion (a co-dispersion of the base resin and the etherified resin component) was sampled for a particle size distribution analysis (using a particle size analyzer from Horiba, Instruments Inc.). The diameter of essentially all dispersed particles was found to be below 1.73 microns, and the diameter of 99.7% of the particles was found to be below 1.51 microns. After filtration, the viscosity of the aqueous dispersion was 1540 cp, and the particle size distribution did not substantially change. The final aqueous dispersion also had a solids content of 45.7% by weight, a water content of 41.8% by weight, a free formaldehyde content of 1.01% by weight, a pH of 5.88, and a specific gravity of 1.101. Importantly, the resin did not separate or otherwise show any signs of instability. The experimental product continues to exhibit excellent stability after more than 15 months of storage.

EXAMPLE 3 (COMPARATIVE)

In Example 6 (Comparative) of U.S. Pat. No. 5,548,015 (hereinafter the '015 patent), the preparation of an aqueous dispersion of a phenol/formaldehyde resin was attempted by incorporating the commercially available resin GP BKS-7570® as an etherified resin component. This resin is a phenol/formaldehyde resin that has been etherified with n-butanol. After forming a dispersion of a phenol/formaldehyde base resin and this etherified resin component, the dispersion was found to be unstable, and it separated in less than 3 months. Compared to the etherified bisphenol-A/formaldehyde resin that was successfully employed in making hydrophilic phenolic resin dispersions described in the '015 patent, the GP BKS-7570® component was much less hydrophobic, a property thought to lead to its poor dispersion forming ability.

However, as seen in Example 2 above, the use of an etherified phenol/cresol/formaldehyde resin component can in fact provide a stable dispersion of a phenolic resin. The etherified resin component prepared in Example 1, and used in the aqueous phenol/formaldehyde resin dispersion of Example 2, surprisingly contained a substantial portion of etherified phenol/formaldehyde, which was found in the '015 patent to be unsuitable as an etherified resin component, presumably due to its low hydrophobicity. Moreover, etherified cresol/formaldehyde resin, also present in the etherified resin component in the stable dispersion formed in Example 2 above, is also less hydrophobic than the etherified bisphenol-A/formaldehyde resin that was employed in making hydrophilic phenolic resin dispersions described in the '015 patent.

Importantly, in the preparation in Example 2, the etherified resin component was added to the base resin at a temperature of 30° C.-50° C., rather than added to hot (90° C.) base resin as described in the '015 patent. Also, the amount of etherified resin added in Example 2 represented about 69% by weight of the base resin, compared to about 35% by weight in Example 6 (Comparative) of the '015 patent.

EXAMPLE 4 (COMPARATIVE)

In Example 7 (Comparative) of the '015 patent, the preparation of an aqueous dispersion of a phenol/formaldehyde resin was attempted by incorporating the commercially available resin GP BKS-7590® as an etherified resin component. This resin is a mixture of phenol, cresol, xylenol, ethylphenol and formaldehyde that has been etherified with n-butanol. After forming a dispersion of a phenol/formaldehyde base resin and this etherified resin component, the dispersion was found to be unstable, and it separated in less than 3 months. Although the GP BKS-7590® etherified resin component was more hydrophobic than the GP BKS-7570® used in Example 6 (Comparative), it was still less hydrophobic than the etherified bisphenol-A/formaldehyde resin that was successfully employed in making hydrophilic phenolic resin dispersions described in the '015 patent. This comparatively lower hydrophobicity of the GP BKS-7590® etherified resin was thought to lead to its poor dispersion forming ability.

However, as seen in Example 2 above, the use of an etherified phenol/cresol/formaldehyde resin component can in fact provide a stable dispersion of a phenolic resin. The etherified resin component prepared in Example 1, and used in the phenol/formaldehyde resin dispersion of Example 2, surprisingly contains a substantial portion of etherified phenol/cresol/formaldehyde resin. This resin component is therefore very similar in composition to the etherified resin GP BKS-7590®, which was found in the '015 patent to be unsuitable, presumably due to its insufficient hydrophobicity. The most significant difference between the etherified resin component used in Example 2 above and GP BKS-7590® is the lack of xylenols (dimethylphenol isomers) in the former, making it especially desirable for the preparation of coatings used to contact food surfaces.

Importantly, in the preparation in Example 2, the etherified resin component was added to the base resin at a temperature of 30° C.-50° C., rather than added to hot (90° C.) base resin as described in the '015 patent. Also, the amount of etherified resin added in Example 2 represented about 69% by weight of the base resin, compared to about 35% by weight in Example 7 (Comparative) of the '015 patent.

What is claimed is:

1. A storage stable aqueous dispersion of a phenolic resin, said dispersion comprising:
   (a) a heat-reactive, non-etherified hydrophilic phenolic base resin that is the reaction product of phenol and formaldehyde reacted in a molar ratio of formaldehyde to phenol from about 1:1 to about 2:1;
   (b) an etherified resin component selected from the group consisting of an etherified phenol/aldehyde resin, an etherified cresol/aldehyde resin, an etherified phenol/cresol/aldehyde resin and mixtures thereof, wherein said etherified resin component is present in an amount of at least about 20% by weight of said base resin; and
   (c) a protective colloid,
   wherein said dispersion remains visually homogeneous by not exhibiting any separation, settling, foaming, coalescence or agglomeration of a dispersed phase for at least about 3 months.

2. The dispersion of claim 1, wherein said etherified resin component is blended with said base resin at a blending temperature from about 25° C. to about 60° C.

3. The dispersion of claim 1 wherein the etherified resin component comprises 60% to 80% by weight of the phenolic base resin.

4. The dispersion of claim 1, wherein said etherified resin component comprises an etherified phenol/formaldehyde resin.

5. The dispersion of claim 4, wherein said etherified resin component comprises an etherified phenol/cresol/formaldehyde resin.

6. The dispersion of claim 1, wherein said dispersion has a bisphenol-A content of less than about 0.1% by weight and a xylenol content of less than about 0.1% by weight.

7. The dispersion of claim 1, wherein said protective colloid comprises polyvinyl alcohol.

8. The dispersion of claim 6, wherein said protective colloid is present in an amount representing from about 5% to about 15% of the combined weight of aromatic alcohol and aldehyde reacted to form said base resin.

9. The dispersion of claim 1, wherein said etherified resin component is present in an amount from about 30% to about 80% by weight of said base resin.

10. The dispersion of claim 1, wherein said dispersion has a solids content of at least about 35% by weight.

11. The dispersion of claim 10, wherein said solids content is from about 40% to about 80% by weight.

12. The dispersion of claim 1, wherein said dispersion is storage stable for at least about 6 months.

13. A method for making a storage stable aqueous dispersion of a phenolic resin, said method comprising blending, at a blending temperature of less than about 60° C., (a) a heat-reactive, non-etherified hydrophilic phenolic base resin that is the reaction product of phenol and formaldehyde, and (b) an etherified resin component selected from the group consisting of an etherified phenol/aldehyde resin, an etherified cresol/aldehyde resin, an etherified phenol/cresol/aldehyde resin, and mixtures thereof, wherein said etherified resin component is present in an amount of at least about 20% by weight of said base resin, to form a resin mixture and forming the storage stable aqueous dispersion by mixing the resin mixture with (c) a protective colloid, so that the aqueous dispersion remains visually homogeneous by not exhibiting any separation, settling, foaming, coalescence or agglomeration of a dispersed phase for at least about 3 months.

14. The method of claim 13, wherein said etherified resin component is formed from reacting n-butanol with a phenol/cresol/aldehyde adduct having a functionality from about 1.5 to about 2.75.

15. The method of claim 13, wherein said blending temperature is from about 25° C. to about 60° C.

16. The method of claim 13, wherein said base resin is in an aqueous solution.

17. The method of claim 13, wherein said etherified resin component has a solids content of at least about 35% by weight.

18. The method of claim 17, wherein said solids content is from about 50% to about 75% by weight.

19. A storage stable aqueous dispersion made according to the method of claim 13, wherein said dispersion is storage stable for at least about 3 months.

* * * * *